United States Patent
Tsai

(10) Patent No.: US 10,142,956 B2
(45) Date of Patent: Nov. 27, 2018

(54) APPARATUSES AND METHODS FOR PROVIDING ASSISTANCE INFORMATION FOR CALLS UNDER ISOLATED E-UTRAN OPERATION FOR PUBLIC SAFETY (IOPS)

(71) Applicant: Acer Incorporated, New Taipei (TW)

(72) Inventor: Wei-Chieh Tsai, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 131 days.

(21) Appl. No.: 15/212,093

(22) Filed: Jul. 15, 2016

(65) Prior Publication Data

US 2017/0188325 A1    Jun. 29, 2017

Related U.S. Application Data

(60) Provisional application No. 62/387,240, filed on Dec. 23, 2015.

(30) Foreign Application Priority Data

May 20, 2016    (TW) .............................. 105115681 A

(51) Int. Cl.
*H04W 60/04*    (2009.01)
*H04W 8/04*    (2009.01)
(Continued)

(52) U.S. Cl.
CPC ............ *H04W 60/04* (2013.01); *H04W 4/90* (2018.02); *H04W 8/04* (2013.01); *H04W 12/06* (2013.01);
(Continued)

(58) Field of Classification Search
CPC ......... H04W 28/0236; H04W 36/0066; H04W 60/04; H04W 76/007; H04W 68/00; H04W 12/06; H04W 8/04; H04W 88/08
See application file for complete search history.

(56) References Cited

U.S. PATENT DOCUMENTS

2008/0162935 A1*   7/2008   Ginzboorg ............ H04L 9/0822
                                                                 713/170
2013/0044709 A1*   2/2013   Adjakple ............ H04W 76/025
                                                                  370/329
(Continued)

FOREIGN PATENT DOCUMENTS

WO    WO 2013/009509 A1    1/2013
WO    WO 2015/166099 A1    11/2015

OTHER PUBLICATIONS

Koch, LTE-based Public Safety Networks—Challenges and Requirements, 9 pages (Year: 2013).*

(Continued)

*Primary Examiner* — Hadi S Armouche
*Assistant Examiner* — Huan V Doan
(74) *Attorney, Agent, or Firm* — McClure, Qualey & Rodack, LLP

(57) ABSTRACT

A mobile communication device including a wireless transceiver and a controller is provided. The wireless transceiver performs wireless transmission and reception to and from a service network. The controller determines whether the service network is an Isolated E-UTRAN Operation for Public Safety (IOPS) network, and transmits a first ATTACH REQUEST message including an IOPS indicator to the service network via the wireless transceiver in response to the service network being an IOPS network. Also, the controller receives a first ATTACH ACCEPT message including encrypted mapping information from the service network via the wireless transceiver, and transmits a first ATTACH COMPLETE message to the service network via the wireless transceiver.

8 Claims, 5 Drawing Sheets

(51) Int. Cl.
H04W 12/06 (2009.01)
H04W 76/50 (2018.01)
H04W 4/90 (2018.01)
H04W 12/02 (2009.01)
H04W 88/08 (2009.01)

(52) U.S. Cl.
CPC ............ *H04W 76/50* (2018.02); *H04W 12/02* (2013.01); *H04W 88/08* (2013.01)

(56) References Cited

U.S. PATENT DOCUMENTS

| | | | | |
|---|---|---|---|---|
| 2013/0128873 A1* | 5/2013 | Eipe | ...................... | H04W 76/02 370/338 |
| 2014/0335791 A1* | 11/2014 | Kim | ...................... | H04W 4/008 455/41.2 |
| 2015/0381562 A1* | 12/2015 | Efrati | .................. | H04L 61/1594 455/415 |
| 2016/0050643 A1* | 2/2016 | Pudney | ............... | H04W 72/048 455/450 |
| 2016/0345151 A1* | 11/2016 | Chen | .................... | H04W 48/16 |
| 2017/0006536 A1* | 1/2017 | Baek | .................... | H04W 4/005 |
| 2017/0078947 A1* | 3/2017 | Lee | ........................ | H04W 48/02 |
| 2017/0118635 A1* | 4/2017 | Jerichow | ............... | H04W 12/04 |
| 2017/0318613 A1* | 11/2017 | Kuge | .................. | H04W 76/021 |
| 2017/0353856 A1* | 12/2017 | Zhang | .................. | H04W 12/04 |
| 2018/0007571 A1* | 1/2018 | Chandramouli | ...... | H04W 24/04 |

OTHER PUBLICATIONS

Unknown author, "3GPP TS 22.346", V13.0.0, 13 pages (Year: 2014).*

Chinese language office action dated Dec. 9, 2016, issued in application No. TW 105115681.
"3rd Gerneration Partnership Project; Technical Specification Group Services and System Aspects; General Packet Radio Service (GPRS) enhancements for Evolved Universal Terrestrial Radio Access Network (U-TRAN) access (Release 13);" Sep. 2015; pp. 1-13.
"Authentication for IOPS;" 3GPP TSG SA WG3 (Security) Meeting #80; Aug. 2015; pp. s 1-4.
"3rd Generation Partnership Project; Technical Specification Group Radio Access Network; Evolved Universal Terrestrial Radio Access (U-TRA) and Evolved Packet Core (EPC); Common Test Environments for User Equipment (UE) Conformance Testing (Release 12);" Dec. 2015; pp. 1-389.
"3rd Generation Partnership Project; Technical Specification Group Core Network and Terminals; Non-Access-Stratum (NAS) protocol for Evolved Packet System (EPS); Stage 3 (Release 13);" Dec. 2015; pp. 1-401.
"Nokia & Telia Sonera; MSISDN passed to the VPLMN and WLAN-AN for charging purposes;" 3GPP TSG CN WG4 Meeting #22bis; May 2004; pp. 1-3.
"General Dynamic UK Ltd: New Study Item for Enhanced Security Aspects of Isolated E-UTRAN operation for Public Safety;" 3GPP TSG/SA WG-3 Meeting #81; Nov. 2015; pp. 1-6.
"Alcatel-Lucent: Discussion on Security Solution for IOPS;" 3GPP TSG SA WG3 (Security) Meeting #80; Aug. 2015; pp. 1-5.
"3rd Generation Partnership Project; Technical Specification Group Services and System Aspects; General Packet Radio Service (GPRS) Enhancements for Evolved Universal Terrestrial Radio Access Network (E-UTRAN) Access (Release 13);" Dec. 2015; pp. 1-337.
"3rd Generation Partnership Project; Technical Specification Group Services and System Aspects; Study on Isolated Evolved Universal Terrestrial Radio Access Network (E-UTRAN) Operating for Public Safety; Security Aspects (Release 13);" Dec. 2015; pp. 1-24.

* cited by examiner

APPARATUSES AND METHODS FOR PROVIDING ASSISTANCE INFORMATION FOR CALLS UNDER ISOLATED E-UTRAN OPERATION FOR PUBLIC SAFETY (IOPS)

CROSS REFERENCE TO RELATED APPLICATIONS

This application claims priority of U.S. Provisional Application No. 62/387,240, filed on Dec. 23, 2015, and the entirety of which is incorporated by reference herein. This application claims priority of Taiwan Application No. 105115681, filed on May 20, 2016, the entirety of which is incorporated by reference herein.

BACKGROUND OF THE APPLICATION

Field of the Application

The application generally relates to management of call establishment information, and more particularly, to mobile communication devices, Mobility Management Entities (MMEs), Home Subscriber Server (HSS), and methods for providing assistance information for calls under Isolated E-UTRAN Operation for Public Safety (IOPS).

Description of the Related Art

To respond to the growing demand for ubiquitous computing and networking, various wireless technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and Time-Division LTE (TD-LTE) technology, etc.

Using release 13 of the LTE technology as an example, the concept of Isolated E-UTRAN Operation for Public Safety (IOPS) is proposed. Generally speaking, IOPS aims to maintain a certain level of services for public safety users even when the network is not fully functional, e.g., when an eNodeB or a set of eNodeBs has/have lost backhaul communications with the core network due to a large scale disaster. The standalone/nomadic eNodeB(s) may still create a serving radio access network without the backhaul communications, to provide service to users within the coverage of the eNodeB(s).

However, due to isolation from the core network, the standalone/nomadic eNodeB(s) cannot acquire necessary information for call establishment. As a result, the standalone/nomadic eNodeB(s) may not be able to process the user's call requests from its service region.

BRIEF SUMMARY OF THE APPLICATION

In a first aspect of the application, a mobile communication device comprising a wireless transceiver and a controller is provided. The wireless transceiver is configured to perform wireless transmission and reception to and from a service network. The controller is configured to determine whether the service network is an Isolated E-UTRAN Operation for Public Safety (IOPS) network, transmit a first ATTACH REQUEST message comprising an IOPS indicator to the service network via the wireless transceiver in response to the service network being an IOPS network, receive a first ATTACH ACCEPT message comprising encrypted mapping information from the service network via the wireless transceiver, and transmit a first ATTACH COMPLETE message to the service network via the wireless transceiver.

In a second aspect of the application, a method for providing assistance information for calls under IOPS, executed by a mobile communication device, is provided. The method comprises the steps of: determining whether a service network is an IOPS network; transmitting a first ATTACH REQUEST message comprising an IOPS indicator to the service network in response to the service network being an IOPS network; receiving a first ATTACH ACCEPT message comprising encrypted mapping information from the service network; and transmitting a first ATTACH COMPLETE message to the service network.

In a third aspect of the application, a Mobility Management Entity (MME) coupled to a cellular station is provided. The MME comprises a controller and a non-transitory computer readable storage medium. The non-transitory computer readable storage medium is configured to store instructions which, when executed by the controller, cause the controller to perform steps comprising: receiving a first ATTACH REQUEST message from a mobile communication device via the cellular station, transmitting an authentication information request message comprising an IOPS indicator to a Home Subscriber Server (HSS) in response to the first ATTACH REQUEST message comprising the IOPS indicator, receiving an authentication information response message comprising encrypted mapping information from the HSS, transmitting a first ATTACH ACCEPT message comprising the encrypted mapping information to the mobile communication device via the cellular station, and receiving a first ATTACH COMPLETE message from the mobile communication device via the cellular station.

In a fourth aspect of the application, a method for providing assistance information for calls under IOPS, executed by an MME coupled to a cellular station, is provided. The method comprises the steps of: receiving a first ATTACH REQUEST message from a mobile communication device via the cellular station; transmitting an authentication information request message comprising an IOPS indicator to a Home Subscriber Server (HSS) in response to the first ATTACH REQUEST message comprising the IOPS indicator; receiving an authentication information response message comprising encrypted mapping information from the HSS; transmitting a first ATTACH ACCEPT message comprising the encrypted mapping information to the mobile communication device via the cellular station; and receiving a first ATTACH COMPLETE message from the mobile communication device via the cellular station.

In a fifth aspect of the application, a HSS coupled to an MME is provided. The HSS comprises a controller and a non-transitory computer readable storage medium. The non-transitory computer readable storage medium is configured to store instructions which, when executed by the controller, cause the controller to perform steps comprising: receiving an authentication information request message from the MME, determining an International Mobile Subscriber Identification (IMSI) and a Mobile Subscriber International ISDN number (MSISDN) of a mobile communication device according to the authentication information request message in response to the authentication information request message comprising an IOPS indicator, encrypting the IMSI and MSISDN to generate encrypted mapping information, and transmitting an authentication information response message comprising the encrypted mapping information to the MME.

In a sixth aspect of the application, a method for providing assistance information for calls under IOPS, executed by a HSS coupled to an MME, is provided. The method comprises the steps of: receiving an authentication information request message from the MME; determining an IMSI and a MSISDN of a mobile communication device according to the authentication information request message in response to the authentication information request message comprising an IOPS indicator; encrypting the IMSI and MSISDN to generate encrypted mapping information; and transmitting an authentication information response message comprising the encrypted mapping information to the MME.

Other aspects and features of the invention will become apparent to those with ordinary skill in the art upon review of the following descriptions of specific embodiments of the mobile communication devices, MMEs, HSS, and methods for providing assistance information for calls under IOPS.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3rd Generation Partnership Project (3GPP) specifications are used to teach the spirit of the application, and the application is not limited thereto.

Figure 1:
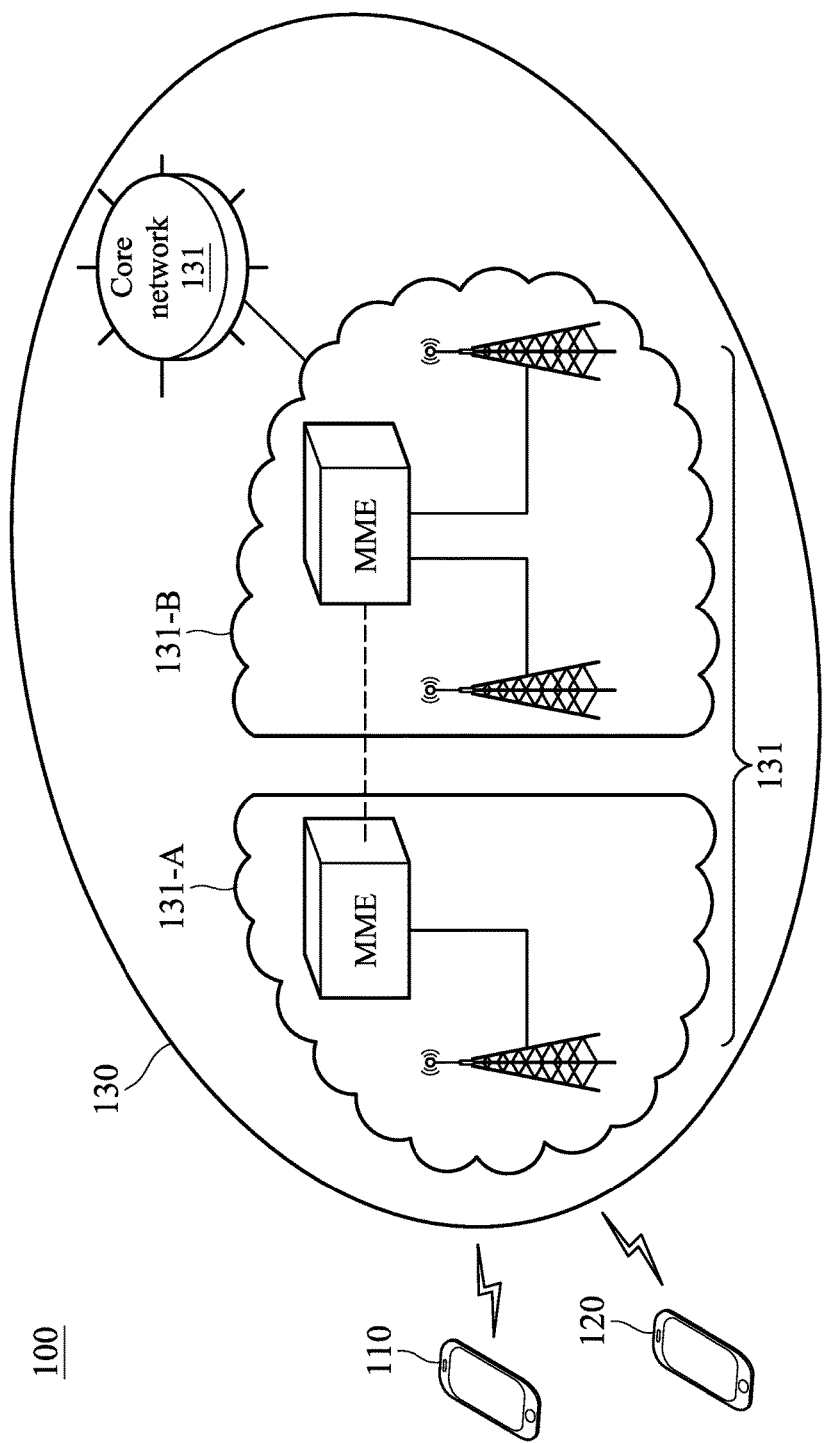
FIG. 1 is a block diagram of a wireless communication environment according to an embodiment of the application.

FIG. 1 is a block diagram of a wireless communication environment according to an embodiment of the application. The wireless communication environment 100 comprises two mobile communication devices 110 and 120, and a service network 130, wherein the mobile communication devices 110 and 120 are wirelessly connected to the service network 130 for obtaining mobile services. Each of the mobile communication devices 110 and 120 may be a feature phone, a smartphone, a panel Personal Computer (PC), a laptop computer, a wearable device/biosensor, or any computing device supporting the wireless technology utilized by the service network 130. The service network 130 may an LTE network, an LTE-A network, or a TD-LTE network. Specifically, the service network 130 comprises an access network 131 and a core network 132, wherein the access network 131 is responsible for processing radio signals, terminating radio protocols, and connecting the mobile communication devices 110 and 120 with the core network 132, while the core network 132 is responsible for performing mobility management, network-side authentication, and interfaces with public/external networks (e.g., the Internet). Each of the access network 131 and the core network 132 may comprise one or more network nodes for carrying out said functions. For example, the access network 131 may include an Evolved-Universal Terrestrial Radio Access (E-UTRAN) and/or a Mobility Management Entity (MME), wherein the E-UTRAN may include at least an evolved-NodeB (eNB), e.g., a macro eNB, femto eNB, or pico eNB, and the core network 132 may be an Evolved Packet Core (EPC) which includes a Home Subscriber Server (HSS), Mobility Management Entity (MME), Serving Gateway (S-GW), and Packet Data Network Gateway (PDN-GW or P-GW), etc.

Specifically, the access network 131 includes two sub-access networks 131-A and 131-B, each of which covers a respective service area. Please note that the mobile communication devices 110 and 120 are in the service area of the sub-access network 131-A. In one embodiment, when a large scale disaster (e.g., an earthquake or a tsunami) occurs, the sub-access network 131-A is isolated from the sub-access network 131-B, i.e., loses backhaul communications with the core network 132, and thus, the sub-access network 131-A becomes an IOPS network and the mobile communication devices 110 and 120 can only obtain mobile services limited within the coverage of the sub-access network 131-A.

Figure 2:
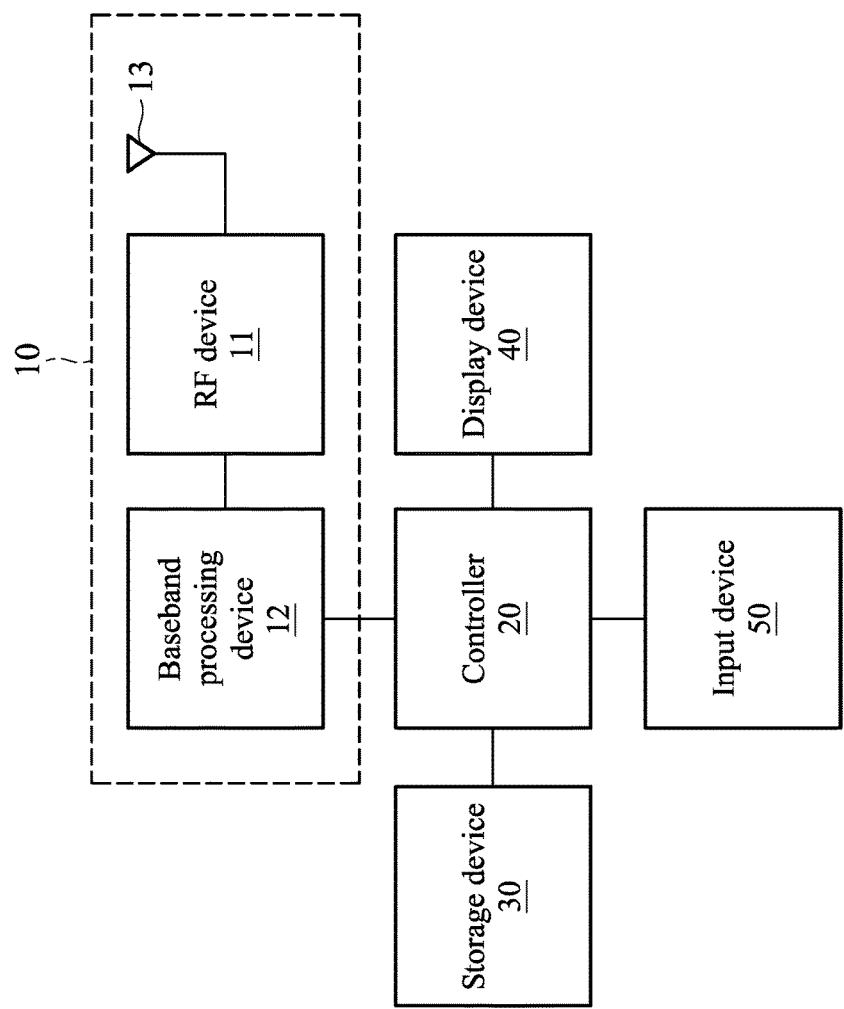
FIG. 2 is a block diagram illustrating a mobile communication device according to an embodiment of the application.

FIG. 2 is a block diagram illustrating a mobile communication device according to an embodiment of the application. A mobile communication device comprises a wireless transceiver 10, a controller 20, a storage device 30, a display device 40, and an input device 50. The wireless transceiver 10 is configured to perform wireless transmission and reception to and from the service network 130. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported wireless technology, wherein the radio frequency may be 900 MHz, 2100 MHz, or 2.6 GHz utilized in the LTE/LTE-A/TD-LTE technology, or another radio frequency, depending on the wireless technology in use.

The controller 20 may be a general-purpose processor, a Micro Control Unit (MCU), an application processor, a Digital Signal Processor (DSP), or the like, which includes various circuitry for providing the function of data processing and computing, controlling the wireless transceiver 10 for wireless communications with the service network 130, storing and retrieving data to and from the storage device 30, sending a series of frame data (e.g. representing text messages, graphics, images, etc.) to the display device 40, and receiving signals from the input device 50. In particular, the controller 20 coordinates the aforementioned operations of the wireless transceiver 10, the storage device 30, the display device 40, and the input device 50 to perform the method of the present application.

In another embodiment, the controller 20 may be incorporated into the baseband processing device 12, serving as a baseband processor.

The storage device 30 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing encrypted mapping information of International Mobile Subscriber Identifications (IMSI) and Mobile Station International Subscriber Directory Number- (MSISDN) of the mobile communication devices 110 and 120, and instructions and/or program code of applications, communication protocols, and/or the method of the present application.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MIMI) for interaction with users.

It should be understood that the components described in the embodiment of FIG. 2 are for illustrative purposes only and are not intended to limit the scope of the application.

Figure 3:
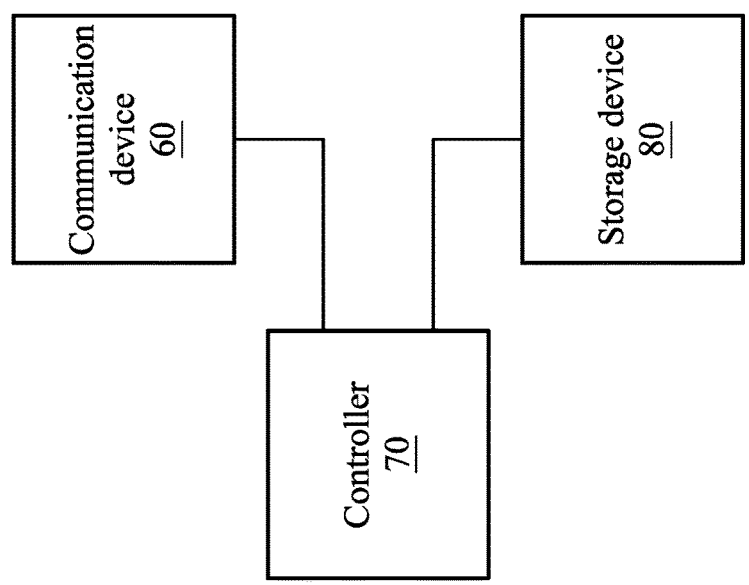
FIG. 3 is a block diagram illustrating a network device according to an embodiment of the application.

FIG. 3 is a block diagram illustrating a network device according to an embodiment of the application. In this embodiment, the network device may be configured to operate as an MME or HSS. The network device includes a communication device 60, a controller 70, and a storage device 80.

The communication device 60 is responsible for providing wired communications with other network entities, such as cellular station(s), MME(s), HSS, S-GW(s), and P-GW(s), of the service network 130. The communication device 60 may include a cable modem, an Asymmetric Digital Subscriber Line (ADSL) modem, a Fiber-Optic Modem (FOM), an Ethernet network interface, or another wired network interface.

The controller 70 may be a general-purpose processor, an MCU, an application processor, a DSP, or the like, which includes various circuitry for providing the function of data processing and computing, controlling the operation of the communication device 60, and loading and executing a series of instructions and/or program codes from the storage device 80, to provide MME/HSS functionality and perform the method of the present application.

The storage device 80 is a non-transitory computer readable storage medium, such as a memory (e.g., RAM, Flash memory, or NVRAM, etc.), a magnetic storage device (e.g., magnetic tape or hard disk), an optical storage device (e.g., CD-ROM), or any combination thereof for storing (encrypted) mapping information of the IMSIs and MSISDNs of the mobile communication devices 110 and 120, instructions and/or program codes of applications, communication protocols, and/or the method of the present application.

Although not shown, the network device may further include other functional units, such as an I/O device (e.g., display device, button, keyboard, mouse, touch pad, or touch screen, etc.), and a display device, and the application is not limited thereto.

As will be appreciated by persons skilled in the art, the circuitry of the controller 20 and 70 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

Figure 4:
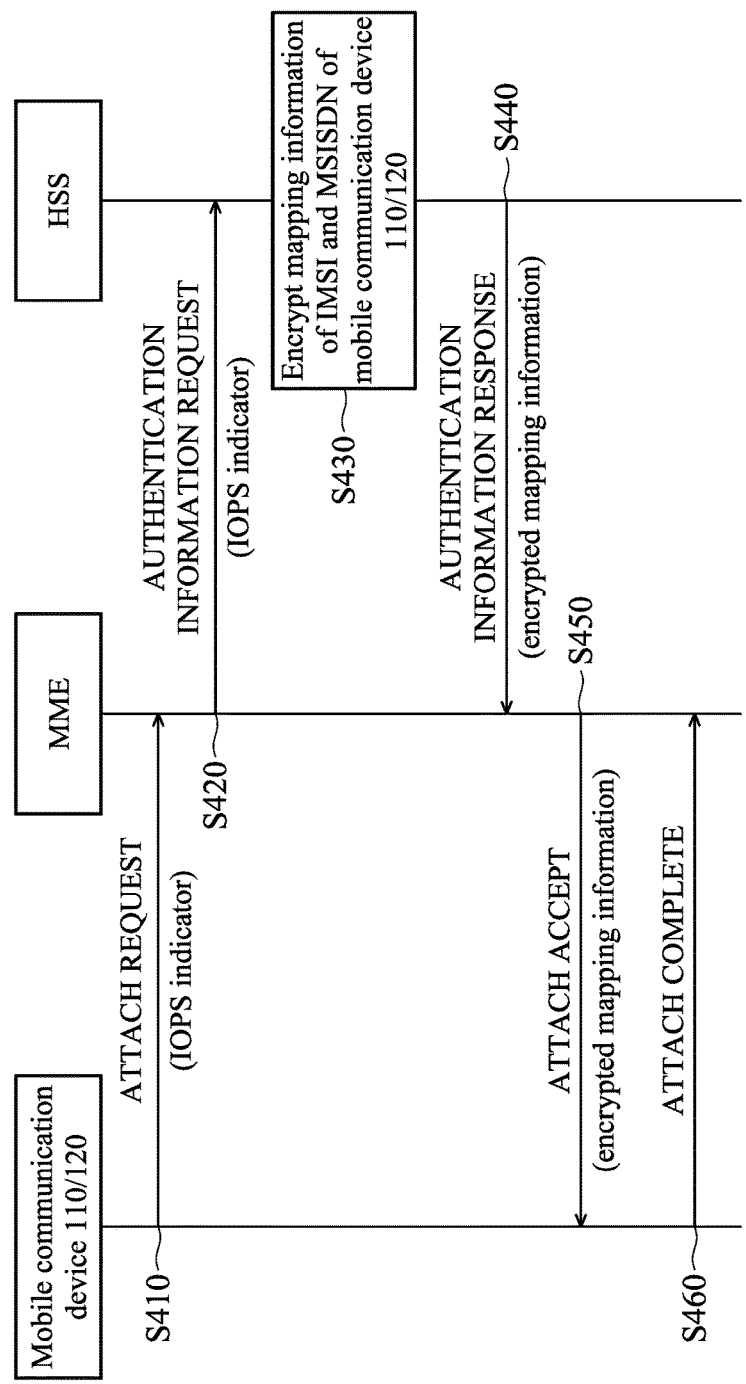
FIG. 4 is a message sequence chart illustrating the provision of assistance information for calls under IOPS according to an embodiment of the application.

FIG. 4 is a message sequence chart illustrating the provision of assistance information for calls under IOPS according to an embodiment of the application. In this embodiment, the method for providing assistance information for calls under IOPS is applied to the coordination of operations between the mobile communication device 110/120 and the service network 130 before the sub-access network 131-A loses backhaul communications with the core network 132. To begin, the mobile communication device 110/120 registers with the service network 130 by transmitting an ATTACH REQUEST message to the MME (via an eNB) in the sub-access network 131-A (step S410). Specifically, the ATTACH REQUEST message includes an IOPS indicator for indicating that the mobile communication device 110/120 supports IOPS.

Subsequently, the MME in the sub-access network 131-A uses the DIAMETER protocol to transmit an AUTHENTICATION INFORMATION REQUEST message including the IOPS indicator to the HSS in the core network 132 (step S420).

The HSS determines the IMSI and MSISDN of the mobile communication device 110/120 and encrypts the mapping information of the IMSI and MSISDN (step S430). Next, the HSS transmits an AUTHENTICATION INFORMATION RESPONSE message including the encrypted mapping information to the MME in the sub-access network 131-A (step S440).

After that, the MME in the sub-access network 131-A transmits an ATTACH ACCEPT message including the encrypted mapping information to the mobile communication device 110/120 (via the eNB in the sub-access network 131-A) (step S450). When receiving the ATTACH ACCEPT message, the mobile communication device 110/120 replies to the MME in the sub-access network 131-A with an ATTACH COMPLETE message (step S460), and the registration is completed.

Figure 5:
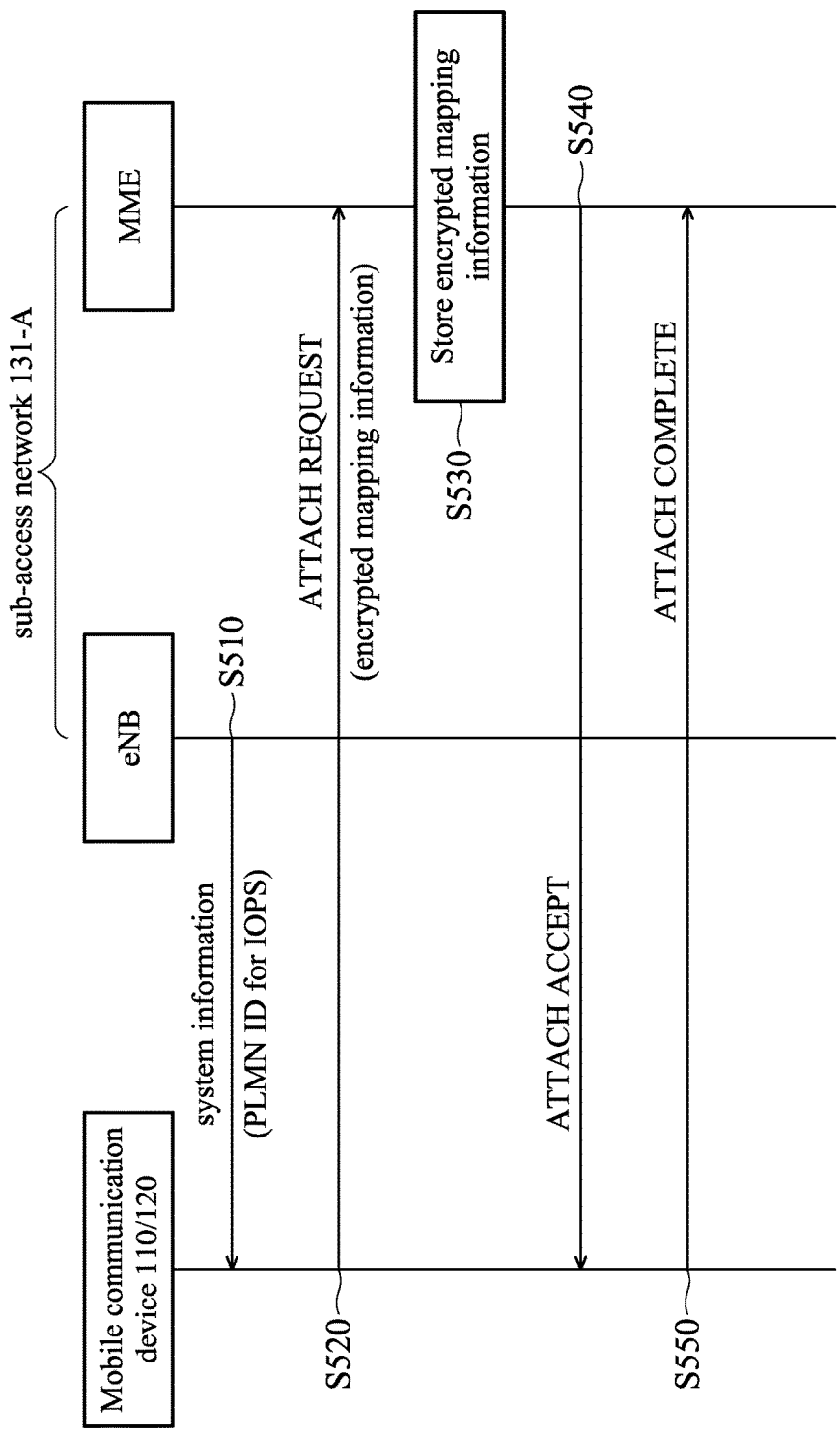
FIG. 5 is a message sequence chart illustrating the provision of assistance information for calls under IOPS according to another embodiment of the application.

FIG. 5 is a message sequence chart illustrating the provision of assistance information for calls under IOPS according to another embodiment of the application. In this embodiment, the method for providing assistance information for calls under IOPS is applied to the coordination of operations between the mobile communication device 110/120 and the service network 130 after the sub-access network 131-A loses backhaul communications with the core network 132. To begin, in response to detecting that the sub-access network 131-A is isolated from the core network 132, the sub-access network 131-A switches to operate in IOPS and starts broadcasting, via the eNB(s), system information including a Public Land Mobile Network (PLMN) Identification (ID) dedicated for IOPS (step S510). For example, the system information may be a System Information Block-1 (SIB1).

When receiving the system information broadcast, the mobile communication device 110/120 registers with the sub-access network 131-A by transmitting an ATTACH REQUEST message to the MME via the eNB in the sub-access network 131-A (step S520). Specifically, the ATTACH REQUEST message includes the encrypted mapping information which was obtained during the registration procedure before the sub-access network 131-A is isolated from the core network 132.

Subsequently, the MME in the sub-access network 131-A stores the encrypted mapping information received from the mobile communication device 110/120 (step S530), and transmits an ATTACH ACCEPT message to the mobile communication device 110/120 via the eNB (step S540). Next, the mobile communication device 110/120 replies to the MME with an ATTACH COMPLETE message (step S550), and the registration is completed.

After both the mobile communication devices 110 and 120 complete registration with the sub-access network 131-A, the MME will have the encrypted mapping information of the mobile communication devices 110 and 120. From then on, when the mobile communication device 110 initiates a call request to the mobile communication device 120, the mobile communication device 110 may include the MSISDN of the recipient (i.e., the mobile communication device 120) in the call request. The MME in the sub-access network 131-A may decrypt the locally stored and encrypted mapping information to determine the IMSI corresponding to the MSISDN included in the call request, and instructs the eNB(s) to page the mobile communication device 120 according to the IMSI.

It should be noted that, regarding other detailed descriptions of the registration procedure, reference may be made to the 3GPP TS 24.008. Also, regarding other detailed descriptions of IOPS, reference may be made to the 3GPP TS 22.346.

In view of the forgoing embodiments of FIGS. 4 and 5, it will be appreciated that the present application realizes call establishment under the limited network architecture for IOPS, by providing assistance information to the isolated access network. Advantageously, the isolated access network may have subscriber identification information, including IMSI and MSISDN, necessary for call establishment, without communications with the core network.

While the application has been described by way of example and in terms of preferred embodiment, it is to be understood that the application is not limited thereto. Those who are skilled in this technology can still make various alterations and modifications without departing from the scope and spirit of this application. Therefore, the scope of the application shall be defined and protected by the following claims and their equivalents.

What is claimed is:

1. A mobile communication device, comprising:
a wireless transceiver, configured to perform wireless transmission and reception to and from a sub-access network; and
a controller, configured to determine whether the sub-access network is an Isolated Evolved-Universal Terrestrial Radio Access (E-UTRAN) Operation for Public Safety (IOPS) network;

wherein, in response to the sub-access network not being an IOPS network, the controller is further configured to: transmit a first Attach Request message comprising an IOPS indicator for indicating that the mobile communication device supports IOPS to the sub-access network via the wireless transceiver, wherein the sub-access network communicates with a Home Subscriber Server (HSS) to receive encrypted mapping information of an International Mobile Subscriber Identification (IMSI) and a Mobile Station International Subscriber Directory Number (MSISDN) of the mobile communication device, receive a first Attach Accept message comprising encrypted mapping information from the sub-access network via the wireless transceiver, and transmit a first Attach Complete message to the sub-access network via the wireless transceiver;

wherein, in response to the sub-access network being the IOPS network, the controller is further configured to: receive a Public Land Mobile Network (PLMN) Identification for IOPS from the sub-access network via the wireless transceiver, transmit a second Attach Request message comprising the encrypted mapping information to the sub-access network via the wireless transceiver, receive a second Attach Accept message from the sub-access network, which does not communicate with the HSS, via the wireless transceiver, and transmit a second Attach Complete message to the sub-access network via the wireless transceiver.

2. The mobile communication device of claim 1, wherein the PLMN Identification for IOPS is received in a System Information Block-1 (SIB1) from the sub-access network, and the determination of whether the sub-access network is an IOPS network is performed based on the SIB1.

3. A method for providing assistance information for calls under Isolated Evolved-Universal Terrestrial Radio Access (E-UTRAN) Operation for Public Safety (IOPS), executed by a mobile communication device, the method comprising:
determining whether a sub-access network is an IOPS network;
in response to the sub-access network not being an IOPS network,
transmitting a first Attach Request message comprising an IOPS indicator for indicating that the mobile communication device supports IOPS to the sub-access network, wherein the sub-access network communicates with a Home Subscriber Server (HSS) to receive encrypted mapping information of an International Mobile Subscriber Identification (IMSI) and a Mobile Station International Subscriber Directory Number (MSISDN) of the mobile communication device,
receiving a first Attach Accept message comprising encrypted mapping information from the sub-access network, and
transmitting a first Attach Complete message to the sub-access network; and
in response to the sub-access network being the IOPS network,
receiving a Public Land Mobile Network (PLMN) Identification for IOPS from the sub-access network,
transmitting a second Attach Request message comprising the encrypted mapping information to the sub-access network,
receiving a second Attach Accept message from the sub-access network which does not communicate with the HSS, and transmitting a second Attach Complete message to the sub-access network.

4. The method of claim 3,
wherein the PLMN Identification for IOPS is received in a System Information Block-1 (SIB1) from the sub-access network;
wherein the determination of whether the sub-access network is an IOPS network is performed based on the SIB1.

5. A Mobility Management Entity (MME) of a sub-access network, which is coupled to a cellular station, comprising:
a controller; and
a non-transitory computer readable storage medium, configured to store instructions which, when executed by the controller, cause the controller to perform steps comprising:
in response to the sub-access network not being an Operation for Public Safety (IOPS) network,
receiving a first Attach Request message comprising an IOPS indicator from a mobile communication device via the cellular station, wherein the IOPS indicator indicates that the mobile communication device supports IOPS,
transmitting an authentication information request message comprising the IOPS indicator to a Home Subscriber Server (HSS) in response to the first Attach Request message comprising the IOPS indicator,
receiving an authentication information response message comprising encrypted mapping information of an International Mobile Subscriber Identification (IMSI) and a first Mobile Station International Subscriber Directory Number (MSISDN) of the mobile communication device from the HSS,
transmitting a first Attach Accept message comprising the encrypted mapping information to the mobile communication device via the cellular station; and
in response to the sub-access network being the IOPS network,
broadcasting a Public Land Mobile Network (PLMN) Identification for IOPS via the cellular station,
receiving a second Attach Request message comprising the encrypted mapping information from the mobile communication device via the cellular station,
storing the encrypted mapping information in the non-transitory computer readable storage medium,
transmitting a second Attach Accept message to the mobile communication device via the cellular station without communicating with the HSS,
receiving a second Attach Complete message from the mobile communication device via the cellular station, and
decrypting the encrypted mapping information to determine whether the IMSI is corresponding to a second MSISDN in a call request to the mobile communication device.

6. The MME of claim 5, wherein the non-transitory computer readable storage medium is further configured to store the encrypted mapping information, and the steps further comprise:

in response to the sub-access network being the IOPS network,
paging the mobile communication device via the cellular station according to the IMSI.

7. A method for providing assistance information for calls under Isolated Evolved-Universal Terrestrial Radio Access (E-UTRAN) Operation for Public Safety (IOPS), executed by a Mobility Management Entity (MME) of a sub-access network, which is coupled to a cellular station, the method comprising:
in response to the sub-access network not being an IOPS network,
receiving a first Attach Request message comprising an IOPS indicator from a mobile communication device via the cellular station, wherein the IOPS indicator indicates that the mobile communication device supports IOPS,
transmitting an authentication information request message comprising the IOPS indicator to a Home Subscriber Server (HSS) in response to the first Attach Request message comprising the IOPS indicator,
receiving an authentication information response message comprising encrypted mapping information of an International Mobile Subscriber Identification (IMSI) and a first Mobile Station International Subscriber Directory Number (MSISDN) of the mobile communication device from the HSS, and
transmitting a first Attach Accept message comprising the encrypted mapping information to the mobile communication device via the cellular station; and
in response to the sub-access network being the IOPS network,
broadcasting a Public Land Mobile Network (PLMN) Identification for IOPS via the cellular station,
receiving a second Attach Request message comprising the encrypted mapping information from the mobile communication device via the cellular station,
storing the encrypted mapping information in the non-transitory computer readable storage medium,
transmitting a second Attach Accept message to the mobile communication device via the cellular station without communicating with the HSS,
receiving a second Attach Complete message from the mobile communication device via the cellular station, and
decrypting the encrypted mapping information to determine whether the IMSI is corresponding to a second MSISDN in a call request to the mobile communication device.

8. The method of claim 7, further comprising:
in response to the sub-access network being the IOPS network,
paging the mobile communication device via the cellular station according to the IMSI.

* * * * *